US011472360B2

(12) United States Patent
Tejeda et al.

(10) Patent No.: US 11,472,360 B2
(45) Date of Patent: Oct. 18, 2022

(54) RESTRAINT SYSTEM OPERATING METHOD AND RESTRAINT SYSTEM FOR VEHICLE HAVING DETACHABLE DOORS

(71) Applicant: Ford Global Technologies, LLC, Dearborn, MI (US)

(72) Inventors: Kenny Tejeda, Wixom, MI (US); Roy Joseph Scott, Saline, MI (US); Nial J. Wykes, Grosse Pointe Farms, MI (US); David James Tippy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 16/819,644

(22) Filed: Mar. 16, 2020

(65) Prior Publication Data

US 2021/0284090 A1    Sep. 16, 2021

(51) Int. Cl.
| | |
|---|---|
| *B60R 21/01* | (2006.01) |
| *B60R 21/16* | (2006.01) |
| *B60K 35/00* | (2006.01) |
| *G07C 5/08* | (2006.01) |
| *B60J 5/04* | (2006.01) |
| *B60J 1/17* | (2006.01) |

(52) U.S. Cl.
CPC .............. *B60R 21/01* (2013.01); *B60K 35/00* (2013.01); *B60R 21/16* (2013.01); *G07C 5/0825* (2013.01); *B60J 1/17* (2013.01); *B60J 5/0487* (2013.01); *B60K 2370/171* (2019.05); *B60R 2021/01286* (2013.01)

(58) Field of Classification Search
CPC ................... B60R 21/01; B60R 21/16; B60R 2021/01286; B60R 16/0232; B60K 35/00; B60K 2370/171; B60K 2370/794; G07C 5/0825; B60J 1/17; B60J 5/0487; B60J 5/0486

See application file for complete search history.

(56) References Cited

U.S. PATENT DOCUMENTS

| | | |
|---|---|---|
| 6,553,295 B1 | 4/2003 | Bauch et al. |
| 7,484,756 B2 | 2/2009 | Le et al. |
| 9,758,090 B1 | 9/2017 | Salter et al. |
| 10,399,486 B2 | 9/2019 | Salter et al. |
| 2019/0309721 A1 | 10/2019 | Siddiqui et al. |

*Primary Examiner* — Brian P Sweeney
(74) *Attorney, Agent, or Firm* — Vichit Chea; Carlson, Gaskey & Olds, P.C.

(57) ABSTRACT

A restraint system operating method includes, among other things, when a detachable door is attached to a vehicle, operating a restraint system of a vehicle at least in part in response to a signal from a door sensor of the detachable door. When the detachable door is detached from the vehicle, the method operates the restraint system of the vehicle without relying on the signal from the door sensor.

19 Claims, 2 Drawing Sheets

RESTRAINT SYSTEM OPERATING METHOD AND RESTRAINT SYSTEM FOR VEHICLE HAVING DETACHABLE DOORS

TECHNICAL FIELD

This disclosure relates generally to detecting whether or not a door is attached or detached from a vehicle, and operating a restraint system based, in part, on the detecting.

BACKGROUND

Some vehicles, particularly off-road vehicles, include doors that are detachable. As desired, a user can detach these doors from the vehicle leaving behind respective door openings. The user may wish to operate the vehicle with the doors detached when off-roading and during other driving conditions.

SUMMARY

A restraint system operating method according to an exemplary aspect of the present disclosure includes, among other things, when a detachable door is attached to a vehicle, operating a restraint system of a vehicle at least in part in response to a signal from a door sensor of the detachable door. When the detachable door is detached from the vehicle, the method operates the restraint system of the vehicle without relying on the signal from the door sensor.

Another example of the foregoing method includes detecting that the detachable door is attached to the vehicle when a restraint control module of the vehicle receives a door status signal from the detachable door, and detecting that the detachable door is detached from the vehicle when the restraint control module of the vehicle does not receive the door status signal from the detachable door.

In another example of any of the foregoing methods, the door status signal comprises an electrical signal from a door control module of the detachable door.

In another example of any of the foregoing methods, the electrical signal is a controller area network signal.

Another example of the foregoing method includes, in response to assessing that the detachable door is detached from the vehicle, communicating a door status notification to a user of the vehicle.

In another example of any of the foregoing methods, the door status notification is a visual message displayed within the vehicle.

Another example of any of the foregoing methods includes discontinuing the door status notification in response to an input from the user.

In another example of any of the foregoing methods, the communicating is at a start of a drive cycle of the vehicle.

Another example of any of the foregoing methods includes discontinuing the door status notification after expiration of a set time period.

In another example of any of the foregoing methods includes indicating a fault condition when the detachable door is attached to a vehicle and no signal is received from the door sensor.

A vehicle system according to another exemplary aspect of the present disclosure includes a detachable door of a vehicle, a door sensor of the detachable door, a restraint system, and a restraint control module configured to control operation of the restraint system at least in part in response to a signal from the door sensor when the detachable door is attached to the vehicle, and further configured to control operation of the restraint system without relying on the signal from the door sensor when the detachable door is detached from the vehicle.

In another example of the foregoing system, the restraint control module is further configured to detect whether the detachable door is attached or detached from the vehicle based on whether or not a door status signal from the detachable door is received by the restraint control module.

Another example of any of the foregoing systems includes a door control module of the detachable door that provides the door status signal as an electrical signal when the detachable door is attached to the vehicle.

In another example of any of the foregoing systems, the electrical signal is a controller area network signal.

Another example of any of the foregoing systems includes a window motor of the detachable door that provides the door status signal when the detachable door is attached to the vehicle.

In another example of any of the foregoing systems, the restraint control module is further configured to provide a door status notification to a user when the detachable door is detached from the vehicle.

Another example of any of the foregoing systems includes a display within the vehicle. The display is configured to display the door status notification to the user in response to a communication from the restraint control module.

In another example of any of the foregoing systems, the restraint system includes an airbag.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary method and system that can detect whether a detachable door of a vehicle is attached to a vehicle or detached from the vehicle. Operation of a restraint system of the vehicle can be varied depending on whether the detachable door is attached or detached.

Figure 1:
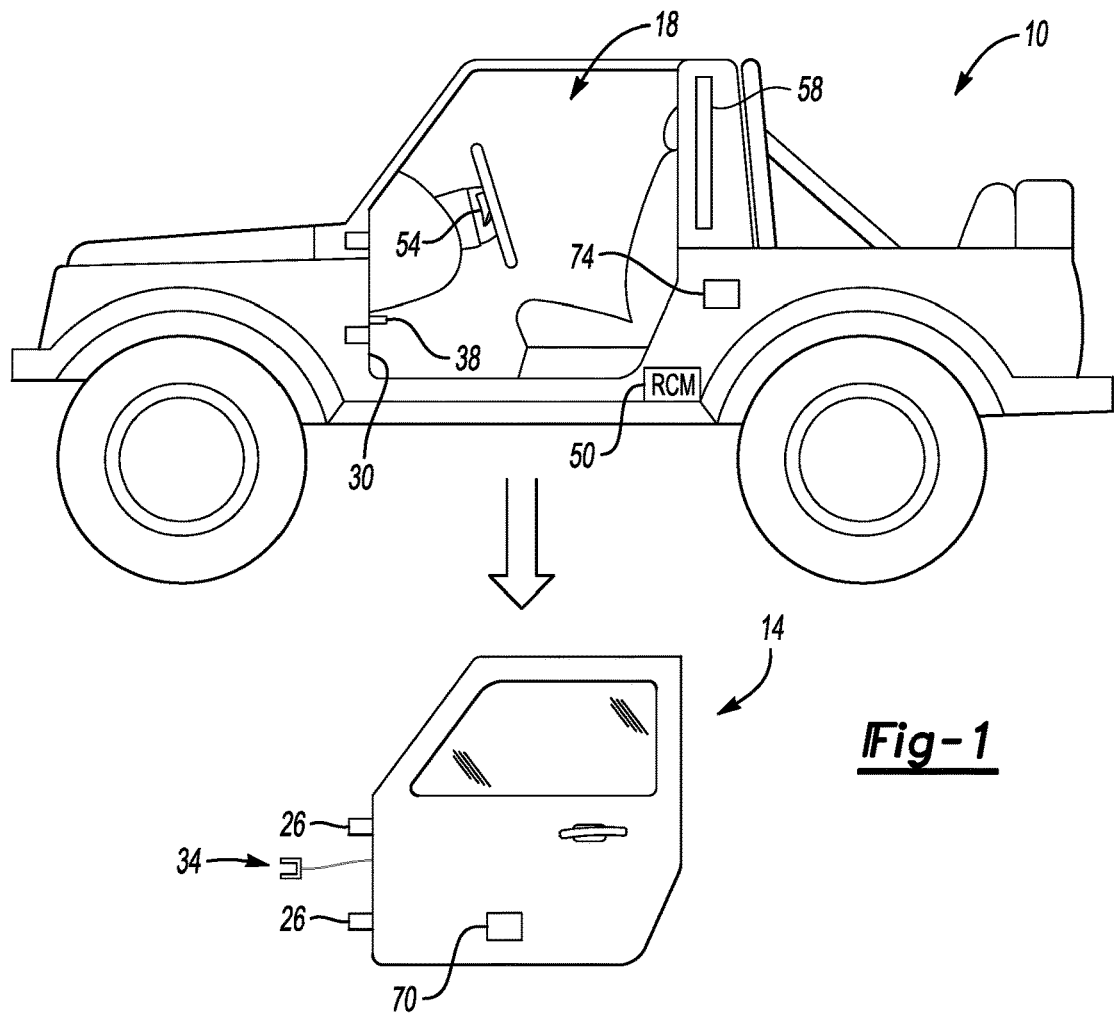
FIG. 1 shows a side view of a vehicle having a detachable door in a detached position according to an exemplary embodiment of the present disclosure.
Figure 2:
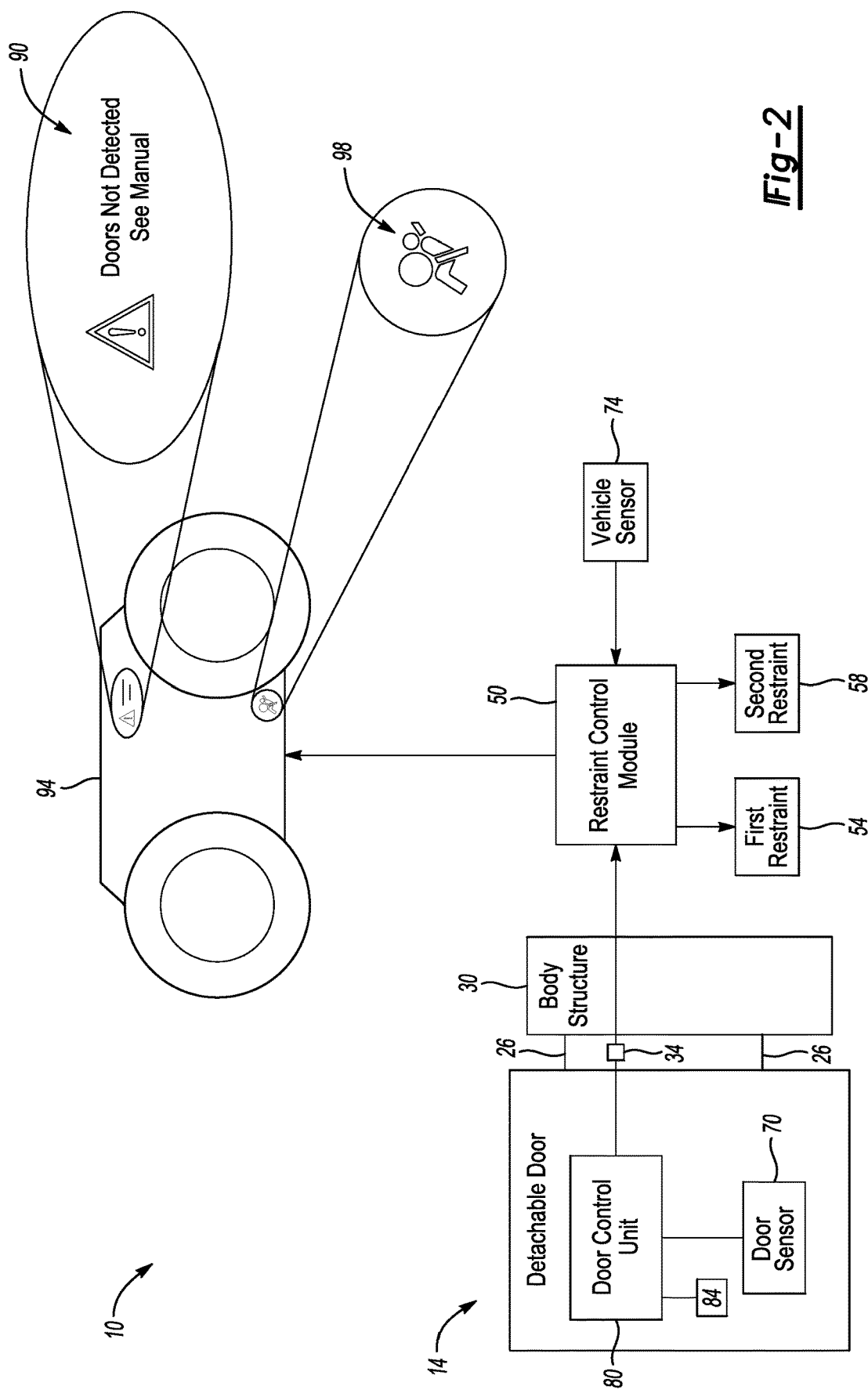
FIG. 2 shows a schematic view of selected portions of the vehicle of FIG. 1.

Referring now to FIGS. 1 and 2, a vehicle 10 includes a door 14 that is detachable. The door 14 is a driver side door. The vehicle 10 could include other detachable doors, such as a detachable passenger side door.

In FIG. 1, the door 14 is in a detached position where the door 14 is detached from the vehicle 10. The door 14 in the detached position provides the vehicle 10 with a door opening 18. A user can operate the vehicle 10 while the door 14 is in the detached position.

In FIG. 2, the door 14 is schematically shown in an attached position where the door 14 is attached to the vehicle 10. When the door 14 is in the attached position, hinges 26 of the door 14 pivotably couple the door 14 to a body structure 30 of the vehicle 10. The coupling of the hinges 26 allows the door 14 in the attached position to pivot between open and closed positions relative to the body structure 30.

Further, when in the attached position, a door harness 34 of the door 14 is coupled to a connector 38 of the vehicle 10. The coupling of the door harness 34 to the connector 38 enables communication between various components of the door 14 and other portions of the vehicle 10.

In the exemplary embodiment, a user can transition the door 14 from the detached position to the attached position by coupling the hinges 26 of the door 14 to the body structure 30, and by coupling the door harness 34 to the connector 38. The user can transition the door 14 from the attached position back to the detached position by decoupling the hinges 26 of the door 14 from the body structure 30 of the vehicle 10, and by decoupling the door harness 34.

In the exemplary embodiment, the vehicle 10 includes a restraint system having a restraint control module (RCM) 50 and at least one first restraint 54 and at least one second restraint 58. The RCM 50, the first restraint 54, and the second restraint 58 are all outside the door 14.

In the exemplary embodiment, the first restraint 54 is an inflatable device, such as an airbag, disposed within a steering wheel area of the vehicle 10, and the second restraint 58 is an inflatable device disposed within a B-pillar area of the vehicle 10. The second restraint 58 could be, for example, a side air curtain or side airbag.

The restraint system can operate such that, in response to a command from the RCM 50, the first restraint 54, the second restraint 58, or both, inflates to transition from the undeployed position shown to a deployed position. In the deployed position, the first restraint 54 and the second restraint 58 can provide a cushioning interface between an occupant of the vehicle 10 and the vehicle 10. The first restraint 54 and second restraint 58 can be deployed to reduce peak forces experienced by the occupant if, for example, an impact load is applied to the vehicle 10.

Although the exemplary first restraint 54 and second restraint 58 are inflatable devices in this example, other types of restraints could be used in other examples. For example, the first restraint 54 could instead be a seatbelt retractor, an anchor pretensioner, or an adaptive pyrotechnic feature on a steering column. The RCM 50 can control operation of such devices instead or, or in addition to, inflatable devices.

The RCM 50 can issue commands to the first restraint 54 and the second restraint 58 based, in part, on sensor signals from sensors. In the exemplary embodiment, the RCM 50 is operably coupled to a door sensor 70 of the door 14 when the door harness 34 is coupled to the connector 38. As the RCM 50 communicates with the door sensor 70 when the door harness 34 is coupled to the connector 38, the RCM 50 is operably coupled to the door sensor 70 when the door 14 is in the attached position, but not when the door 14 is in the detached position. In another example, the door sensor 70 could wirelessly communicate with the RCM 50.

The RCM 50 is additionally coupled to at least one vehicle sensor 74 outside the door 14. The RCM 50 is operably coupled to the vehicle sensor 74 when the door 14 is in the attached position and when the door 14 is in the detached position.

In the exemplary embodiment, the door sensor 70 is a pressure sensor, and the vehicle sensor 74 is an accelerometer, such as G sensor. The door sensor 70 and the vehicle sensor 74 could be other types of sensors in other examples, such as accelerometers, radar sensors, or ultrasonic sensors.

The RCM 50 can receive data from the vehicle sensor 74 and, when the door 14 is in the attached position, the door sensor 70. The RCM 50 can monitor the received data and determine whether or not to deploy the first restraint 54, the second restraint 58, or both. In some examples, the RCM 50 can potentially adjust speed of deployment, direction of deployment, or both, based on received data.

Although schematically illustrated as a single control module, the RCM 50 may be part of an overall vehicle control system, such as a vehicle system controller (VSC), that includes a plurality of additional control modules for interfacing with and commanding operation of the various components of the vehicle 10, including the various components associated with restraints of the vehicle 10, over a controller area network (CAN).

The RCM 50 may include a processing unit and non-transitory memory for executing the various control strategies and modes of the restraint system, including but not limited to the ability to automatically deploy one or more of the restraints 54, 58 in response to signals received from the door sensors 70, the vehicle sensor 74, or both.

The RCM 50 is configured to receive various signals from sensors 70, 74 and other components of the vehicle 10, analyze these signals, and control operation of the restraint system.

When the door 14 is in the attached position, The RCM 50 can receive at least one door status signal from the door 14 in addition to sensor signals from the door sensor 70. The door status signal, in the exemplary embodiment, is communicated through the door harness 34.

The door status signal, in the exemplary embodiment, can be an electrical signal, such as a CAN signal, from a door control unit (DCU) 80 of the door 14. The DCU 80 may, for example, test for a window motor 84 and a connector shunt in the door harness 34. In response to the test, the DCU 80 provides a CAN signal to the RCM 50. The receipt of the CAN signal by the RCM 50 enables the RCM 50 to identify that the door 14 is in the attached position.

In another example, the door status signal could be communicated to the RCM 50 from one or more inductive sensors on the hinges 26.

When the RCM 50 receives the door status signal, the RCM 50 considers the door 14 to be in the attached position. If, however, the RCM 50 does not receive the door status signal, the RCM 50 considers the door 14 to be in the detached position. The RCM 50 is configured to control operation of the restraint system based on whether the door 14 is in the attached position or the detached position.

As an example, when the door 14 is in the attached position, the RCM 50 is configured to control operation of the restraint system at least in part in response to a signal from the door sensor 70. However, when the door 14 is in the detached position, the RCM 50 is configured to control operation of the restraint system without relying on a signal from the door sensor 70.

Because the RCM 50 receives door status signals that indicate whether the door 14 is in the attached or detached position, the RCM 50 does not, when the door is in the detached position, consider the absence of a signal from the door sensor 70 to be a system fault. Thus, when the door 14 is in the detached position, the RCM 50 does not issue an alert notifying the user of a system fault when the RCM 50 does not receive a signal from door sensor 70.

If the RCM 50 were to issue an alert intended to notify the user of a system fault when the door 14 is in the detached position, the RCM 50 would not be operating the restraint system without relying on a signal from the door sensor 70. Instead, the RCM 50 would be operating as if the restraint system were intended to rely on a signal from the door sensor 70.

As shown in FIG. 2, when the exemplary RCM 50 does not receive door status signals from the DCU 80, the RCM 50 can, in some examples, provide the user of the vehicle 10 with a door status notification 90. The door status notification 90, in this example, is a visual message including text and an icon that are displayed on an instrument panel display 94 of the vehicle 10. In another example, the door status notification 90 is displayed on a human machine interface (HMI) screen within a center stack of the vehicle 10. In yet another example, the door status notification 90 is an audible message.

The RCM 50 can, in some examples, command the door status notification 90 to be displayed for a set time period, say 10 seconds, after the vehicle 10 is keyed-on at the start of a drive cycle. After expiration of the set time period, the RCM 50 issues a command that discontinues the display of door status notification 90.

In another example, the RCM 50 continues to command the door status notification 90 to be displayed until receiving an input initiated by the user that cancels the door status notification 90. The input could be a user tapping an icon on the HMI screen.

The door status notification 90 can help the user to understand that the vehicle 10 considers the door 14 to be in the detached position. If, for example, the user has attached the door 14 to the vehicle 10 using the hinges 26, but neglected to connect the door harness 34 to the connector 38, the user would view the door status notification 90 and understand that the electrical connections to the door 14 need to be addressed.

The RCM 50, in some examples, may receive a door status signal that, for example, falls outside a predetermined range. Such a door status signal may represent a fault condition, such as the door harness 34 being damaged. In response to such a door status signal, the RCM 50 may display the door status notification and additionally, display a fault condition notification, such as illuminating a readiness indicator lamp 98 within the vehicle 10. The illuminated readiness indicator lamp 98 can indicate to the user that the door harness 34 requires inspection.

The RCM 50 could instead, or additionally, interpret a fault condition when the door 14 is detected as being attached to the vehicle 10, yet the RCM 50 receives no signal from the door sensor 70.

Figure 3:
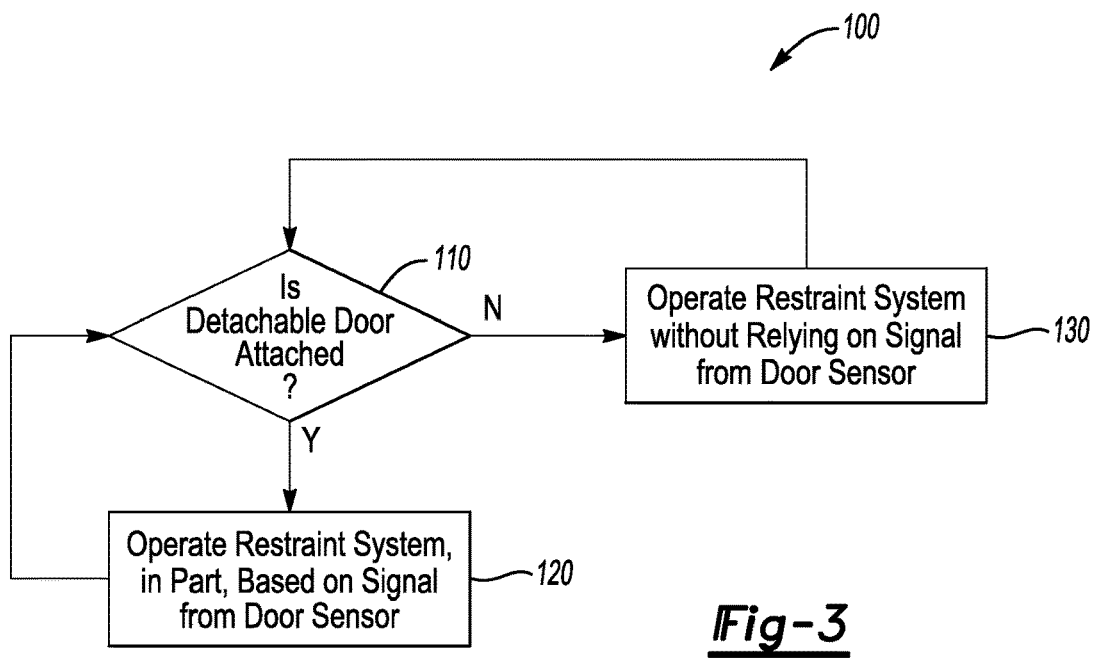
FIG. 3 illustrates the flow of a restraint system operating method according to an exemplary embodiment of the present disclosure.

With reference to FIG. 3, an exemplary restraint system operating method 100 used in connection with the RCM 50 of FIGS. 1 and 2 can begin at a step 110. At the step 110, the method 100 assesses whether or not the door 14 is attached to the vehicle 10. If yes, the method 100 moves to a step 120 where a restraint system is operated at least in part in response to a signal from the door sensor 70. If no, the method 100 moves from the step 110 to a step 130 where the restraint system is operated without relying on the signal from the door sensor 70.

The method 100 could be executed in connection with the door 14 of FIGS. 1 and 2, which is a driver side door. The method 100 could additionally executed in connection with a passenger side door, or another door of the vehicle 10. That is, if the door 14 is detached from the vehicle 10 and the passenger side door is attached to the vehicle 10, the restraint system could operate without relying on a signal from the door sensor 70 in the door 14, but in reliance on a signal from a door sensor in the passenger side door.

Features of the disclosed examples include a vehicle that can utilize sensor signal from a detachable door when the detachable door is attached to the vehicle, but can recognize when the detachable door is detached from the vehicle so as to not expect the sensor signal from the detachable door. That is, the vehicle does not interpret there to be a fault condition when no door sensor signal is received, but the detachable door is detached from the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A restraint system operating method, comprising:
   when a detachable door is attached to a vehicle, operating a restraint system of a vehicle at least in part in response to a signal from a door sensor of the detachable door; and
   when the detachable door is detached from the vehicle, operating the restraint system of the vehicle without relying on the signal from the door sensor of the detachable door.

2. The method of claim 1, further comprising detecting that the detachable door is attached to the vehicle when a restraint control module of the vehicle receives at least one door status signal from the detachable door, and detecting that the detachable door is detached from the vehicle when the restraint control module of the vehicle does not receive the at least one door status signal from the detachable door.

3. The method of claim 2, wherein the at least one door status signal comprises an electrical signal from a door control unit of the detachable door.

4. The method of claim 3, wherein the electrical signal is a controller area network signal.

5. The method of claim 2, further comprising, in response to assessing that the detachable door is detached from the vehicle, communicating a door status notification to a user of the vehicle.

6. The method of claim 5, wherein the door status notification is a visual message displayed within the vehicle.

7. The method of claim 5, further comprising discontinuing the door status notification in response to an input from the user.

8. The method of claim 5, wherein the communicating is at a start of a drive cycle of the vehicle.

9. The method of claim 8, further comprising discontinuing the door status notification after expiration of a set time period.

10. The method of claim 1, further comprising indicating a fault condition when the detachable door is attached to a vehicle and no signal is received from the door sensor.

11. A vehicle system, comprising:
    a detachable door of a vehicle;
    a door sensor of the detachable door;
    a restraint system; and
    a restraint control module configured to control operation of the restraint system at least in part in response to a signal from the door sensor when the detachable door is attached to the vehicle, and further configured to control operation of the restraint system without relying on the signal from the door sensor when the detachable door is detached from the vehicle.

12. The system of claim 11, wherein the restraint control module is further configured to detect whether the detachable door is attached or detached from the vehicle based on whether or not a door status signal from the detachable door is received by the restraint control module.

13. The system of claim 12, further comprising a door control unit of the detachable door that provides the door status signal as an electrical input when the detachable door is attached to the vehicle.

14. The system of claim 13, wherein the electrical input is a controller area network signal.

15. The system of claim 12, further comprising a window motor of the detachable door that provides the input as an electrical input when the detachable door is attached to the vehicle.

16. The system of claim 11, wherein the restraint control module is further configured to provide a door status notification to a user when the detachable door is detached from the vehicle.

17. The system of claim 16, further comprising a display within the vehicle, the display configured to display the door status notification to the user in response to a communication from the restraint control module.

18. The system of claim 11, wherein the restraint system comprises an airbag.

19. The system of claim 11, wherein the restraint control module is configured to control operation of the restraint system at least in part based on a vehicle sensor outside the detachable door when the detachable door is detached from the vehicle.

* * * * *

UNITED STATES PATENT AND TRADEMARK OFFICE
CERTIFICATE OF CORRECTION

| | | |
|---|---|---|
| PATENT NO. | : 11,472,360 B2 | |
| APPLICATION NO. | : 16/819644 | |
| DATED | : October 18, 2022 | |
| INVENTOR(S) | : Kenny Tejeda et al. | |

It is certified that error appears in the above-identified patent and that said Letters Patent is hereby corrected as shown below:

In the Claims

In Claim 15, Column 7, Line 15; replace "the input" with --the signal--

Signed and Sealed this
Twenty-seventh Day of December, 2022

Katherine Kelly Vidal
*Director of the United States Patent and Trademark Office*